United States Patent
Frank et al.

(10) Patent No.: US 6,316,092 B1
(45) Date of Patent: *Nov. 13, 2001

(54) AEROGEL-COATED SHEET

(75) Inventors: Dierk Frank, Hofheim; Fritz Schwertfeger; Andreas Zimmermann, both of Griesheim, all of (DE)

(73) Assignee: Hoechst Research & Technology Deutschland GmbH & Co. KG, Frankfurt am Main (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/051,258
(22) PCT Filed: Oct. 11, 1996
(86) PCT No.: PCT/EP96/04434
§ 371 Date: Dec. 7, 1998
§ 102(e) Date: Dec. 7, 1998
(87) PCT Pub. No.: WO97/13803
PCT Pub. Date: Apr. 17, 1997

(30) Foreign Application Priority Data

Nov. 10, 1995 (DE) .................................. 195 37 821
Feb. 20, 1996 (DE) .................................. 196 06 114

(51) Int. Cl.[7] ...................................................... B32B 3/00
(52) U.S. Cl. ........................................ 428/312.6; 428/312.2
(58) Field of Search ........................................ 428/201, 202, 428/204, 206, 312.2, 312.6

(56) References Cited

U.S. PATENT DOCUMENTS

| | | | | |
|---|---|---|---|---|
| 5,306,555 | * | 4/1994 | Ramamurthi et al. | 428/289 |
| 5,631,097 | * | 5/1997 | Andersen et al. | 428/703 |
| 5,789,075 | * | 8/1998 | Frank et al. | 428/312.6 |
| 5,830,548 | * | 11/1998 | Andersen et al. | 428/36.4 |

FOREIGN PATENT DOCUMENTS

| | | |
|---|---|---|
| 1023881 | 2/1958 | (DE) . |
| 4106727 A1 | 9/1992 | (DE) . |
| 0667370 A2 | 8/1995 | (EP) . |

OTHER PUBLICATIONS

Patent Abstracts of Japan. vol. 17, No. 490, Sep. 6, 1993.
Derwent Publication, Week 9637, AN–96–367002. Jun. 9, 1996.

* cited by examiner

Primary Examiner—Blaine Copenheaver
Assistant Examiner—Christopher Paulraj

(57) ABSTRACT

The invention concerns a coated sheet which includes an aerogel layer, a method of manufacturing the coated sheet and its use.

21 Claims, No Drawings

AEROGEL-COATED SHEET

This application is a 371 of PCT/EP96/04434, filed Oct. 11, 1995.

BACKGROUND OF THE INVENTION

1. Field of the Invention

The present invention relates to thermal insulation materials that are based on aerogels, a process for manufacturing these, and the use thereof.

2. Description of the Related Art

Aerogels are highly porous, low-density materials that are manufactured by forming a gel and then removing the liquid therefrom, whilst retaining the gel structure to a large extent when this is done.

According to a narrow definition (for example, see Gesser and Goswanni, *Chemistry*, rev. 1989, 89, 767), aerogels are materials in which the liquid is removed from the gel under super-critical conditions, whereas if the gel is dried under sub-critical conditions one refers to xerogels, and in the event that the liquid is removed from the frozen state by sublimation, one speaks of cryogels.

Within the context of the present intention, aerogels include all these materials and can contain any other gases apart from air. The gases can also be removed from the aerogel in a vacuum.

In particular, aerogels with porosities of greater than 60% and densities of less than 0.6 g/cm$^3$ exhibit very low thermal conductivities and for this reason are well suited for thermal insulation materials. Because of their low density, such materials exhibit little mechanical stability, however.

Formulations containing aerogels that also incorporate a binder in order to overcome this disadvantage are described, for example, in EP-A 0 340 707 and DE-A 44 37 424. In order to obtain highly effective aerogels that can additionally be transparent, the aerogel can be reinforced by incorporating fibres (see, for example, DE-A 44 30 642). However, all of these processes entail the disadvantage that the incorporation of alien substances increases the thermal conductivity of the aerogel material.

Brinker et al. (*Nature*, 1995, 374, 439) describe a process for manufacturing thin aerogel films on rigid substrates, with thermally insulating cladding for buildings being seen as one possible application.

Surprisingly, it was found that aerogels can be applied to flexible films as a thin layer, which means that aerogel materials of good mechanical stability can be manufactured.

DE-A 38 44 003 describes films that are coated with silica gel, said films additionally containing photochromic compounds. In order to manufactured these, a washing liquid that contains up to 5% polyvinylalcohol in addition to the photochromic substances is placed in a liquor tank. A transparent film, for example of polyacrylate film, is passed through the liquor, and waterglass and sulphuric acid solution is sprayed onto the film of liquid that is formed by doing this, when the silica gel is precipitated out. The film that is so coated is dried at approximately 80° C. at a pressure of 0.1 to 0.5 bar. However, this manufacturing process does not produce a product with a gel structure and for this reason this does not involve an aerogel-coated film.

BRIEF SUMMARY OF THE INVENTION

For this reason, the object of the present invention is a coated film that contains an aerogel layer.

DETAILED DESCRIPTION OF THE INVENTION

In a special embodiment of the film according to the present invention, the aerogel, preferably in the form of powder or granulate, is incorporated into the film, preferably in the form of powder or granulate. The aerogel can be evacuated, although this does not necessarily have to be done.

In addition to low thermal conductivity, the film coated according to the present invention exhibits good mechanical stability.

In a simple manner, it permits a high level of light transmission, and is thus suitable for translucent and opaque thermal insulation.

Because of a low dialectric constant, in conjunction with a low loss factor, it is also suitable for electronic applications.

All common film materials such as polyesters, for example polyethyleneterephthalate (PET), cellulose and its derivatives, for example Cellophane®, polyolefins, for example polyethylene, polypropylene, polystyrene, polymethyl(meth)acrylates, polyvinylchloride, polyamides, and polycarbonates are suitable as films. Generally speaking, molar weight and orientation are not critical. In addition, the films can contain fibres (e.g., glass fibres). In the same way, metal films, for example of aluminum, are similarly suitable, although in this case opaque applications will be pursued.

Preferred film materials are polypropylene and polyethyleneterephthalate, with biaxially oriented films being especially preferred. Films that exhibit the lowest possible flammability are also advantageous.

The films can be imprinted or coloured.

In order to provide for better adhesion of the aerogel layer, it is preferred that the films be pre-treated by using processes available to the practitioner skilled in the art.

Chemical pre-treatment, for example with aminosiloxanes or imines, or a pre-treatment by a corona discharge procedure are preferred.

In principle, all available coating techniques such as dip coating, spin coating, and roller coating, are suitable for this purpose.

The films that have been prepared in this way are generally from 5 to 1000 µm thick.

In the case of transparent films, at least one of the films can be textured or structured in order to achieve particular visual effects. In one preferred embodiment, the film is of such a structure that the transmission of directed light will vary as a function of the angle of incidence. This effect can be achieved, for example, by using a film that has been shaped to a suitable profile (e.g., a saw-tooth profile), which means that laminations are formed by this profile. It is preferred that the laminations be so arranged that their edges are, as far as possible, perpendicular to the direction of incidence of the light. Depending on the angle subtended between the source of the light and the film, there will be a more or less pronounced reflection on the inclined surfaces and thus more or less transmission of light. Because of this, for example, in the case of an application in the domain of transparent thermal insulation, transmission can be high when the Sun is low and—conversely—transmission may be low when the Sun is high. The structuring of the film can be covered by an additional flat film on the side that is remote from the aerogel in order to avoid soiling by the accumulation of dust.

The coated film according to the present invention preferably contains aerogels with porosities of greater than 60%, especially above 70%, and in particular above 80%. Generally speaking, the density of the aerogel is less than 0.6 g/cm$^3$, and preferably less than 0.4 g/cm$^3$. The porosity is defined as a percentage proportion of the pore volume to the total volume of the aerogel.

The thermal conductivity of the aerogel should preferably be less than 40 mW/mK and particular less than 25 mW/mK.

The aerogels that are used according to the present invention are generally obtained in that
a) a sol is produced;
b) if required, fibres are added to the sol;
c) the sol obtained as in b) is converted to a gel;
d) the liquid contained in the gel is exchanged; and
e) the gel obtained as in d) is dried such that an aerogel is formed.

Metal oxide compounds, in particular Si and Al compounds, in particular Si or Al alkoxides, waterglass, organic polycondensates based on melamine formaldehyde resins (U.S. Pat. No. 5,086,085) or resorcin formaldehyde resins (U.S. Pat. No. 4,873,218) or mixtures thereof, which are suitable for the sol-gel technique, serve as the starting material for step a) (C. J. Brinker, G. W. Scherer, *Sol-Gel Science,* 1990, Chapters 2 and 3). In addition, the sol can consist of particulate or colloidal Si or Al oxide. It is preferred that Si compounds, in particular waterglass, be used.

On the surface, the sol particles have functional groups that are capable of condensation. From this point on, these groups will be referred to as surface groups. Typically, sol particles carry hydrophilic hydroxyl groups (OH) from Si or Al compounds. Depending on the manufacturing process, radicals of alkoxy groups (OR) can also be present if alkoxides are used as the starting materials (C. J. Brinker, G. W. Scherer, *Sol-Gel Science,* 1990, Chapter 10).

The radiation contribution to thermal conductivity can be reduced if an IR opacifier such as soot, titanium dioxide, iron oxides, or zirconium dioxide is added to the sol prior to generation of the gel.

If desired, colouring agents and/or pigments can be added in order to achieve coloration.

In addition, fibre material can be added in step b), if desired.

Inorganic fibres, such as glass fibres or mineral fibres, organic fibres such as polyester fibres, aramid fibres, nylon fibres, or fibres of vegetable origin, as well as mixtures of these, can be used as fibre material. These fibres can also be coated, for example, polyester fibres that are metallized with a metal such as aluminium.

Preferred are glass fibres, as well as fibres of the material that serves as the raw material for the uncoated film.

The coating can also serve to provide enhanced adhesion of the aerogel to the fibres, analogously to the so-called coupling agents on the glass fibres used in glass-fibre reinforced plastics.

A visually appropriate appearance can be imparted to the coated film by the addition of the fibre material.

In order to prevent the fibres that are added increasing the thermal conductivity,
a) the volume of the fibres should amount to 0.1 to 30%, preferably 0.1 to 10%, and
b) the thermal conductivity of the fibre material should be as low as possible, preferably <1 mW/mK.

Densities of up to 0.9 g/cm$^3$ can occur if larger volumes of fibres of greater density, such as glass fibres, are used.

The radiation contribution to thermal conductivity can be reduced and greater mechanical strength can be achieved by the suitable selection of the fibre diameter and/or the fibre material. To this end, the diameter of the fibres should be as follows:
a) in the case of non-metallized fibres, preferably 0.1 to 30 μm and/or
b) in the case of metallized fibres, preferably 0.1 to 20 μm.

The radiation contribution to thermal conductivity can be further reduced in that IR opacified fibres such as soot-blackened PET fibres are used.

The mechanical strength of the aerogel layer is also affected by the length and distribution of the fibres in the aerogel. The fibres can be incorporated as individual fibres, and can be either randomly laid or oriented. In this case, they should preferably be at least 1 cm long in order to ensure adequate strength of the composite material.

In order to achieve improved dispersibility of the fibres or cross-linking of the non-woven fabric, the fibres can be coated with a suitable sizing agent. Such a coating can also ensure better bonding of the gel to the fibres.

Transformation of the sol into a gel (step c) can be effected, for example, by hydrolysis and condensation of Si or Al alkoxides, gelling of particulate or colloidal Si or Al oxide, or by a combination of these methods. The production of gels that contain Si is described, for example, in WO 93/06044. The production of the organic gels is described, for example, in U.S. Pat. No. 5,086,085 and U.S. Pat. No. 4,873,218.

If an aqueous gel was used in Step a) and the pH value was changed with a mineral acid, the gel should be washed with water until it is free of electrolyte.

Particularly in the case of individual fibres, the fibres can be added during the formation of the gel if the sol has already achieved a high viscosity but is still not yet firm.

It is advantageous to allow the gel obtained in Step c) or d) to cure in order to increase its strength. Generally speaking, the gel is cured at a temperature from 20° C. up to the boiling point of the liquid contained in the gel. If the gel liquid is water, for example, and the gel matrix is $SiO_2$, the curing process generally takes place at 20 to 90° C., preferably at 20 to 70° C., at a pH value of 6 to 11, preferably 6 to 9, within a period ranging from 1 minute to 48 hours, in particular from 5 minutes to 24 hours.

The liquid that is contained in the gel is replaced by the same or another liquid that is suitable for the drying process that follows in Step e), in at least one washing process (step d).

In general, Steps a) to d) are carried out at a temperature that is between the freezing point of the liquid that is contained in the gel and 70° C., but at most at the boiling temperature of the liquid that is contained in the gel.

The gel that is obtained in Step d) can be dried subcritically to form an aerogel composite material. The drying process is characterised in that
e1) the gel that is obtained in Step d) is so converted with one or a plurality of surface modifying substances so that such a large proportion of the surface groups of the gel are replaced by groups of the surface modifying substance that further condensation between the surface groups on different pore surfaces is largely suppressed and/or the capillary forces are reduced by changing the angle of contact between the pore surface and the liquid that is dried out,
e2) if necessary, the liquid contained in the gel is exchanged, and e3) the resulting gel is dried at a temperature below the critical temperature of the liquid contained in the gel and a pressure of 0.001 bar up to the vapour pressure of this liquid at this temperature.

A liquid that is suitable for the subsequent Steps in the process must be used for washing in Step d). As an example, if the gel contains water it is recommended that the gel be washed with a protic or aprotic organic solvent to the point that the water content of the gel $\leq 5\%$-wt, and preferably $\leq 2\%$-wt.

In general, ethers, esters, or ketones, as well as aliphatic or aromatic hydrocarbons, are used as the organic solvent. Preferred solvents are methanol, ethanol, acetone, tetrahydrofurane, acetic acid ethylester, dioxane, n-hexane, n-heptane, and toluol. Mixtures of these solvents can also be used. In view of the surface modifying substance that is used in the following Step, the solvent must be largely inert.

Because of the surface modifying substances that are used in Step e1), a large proportion of the hydrophilic or reactive surface groups on the surfaces of the pores are converted to hydrophobic surface groups or to surface groups that are not suitable for further condensation.

As a result, further condensation between groups on different pore surfaces is suppressed, or the capillary forces are reduced by changing the angle of contact between the pore wall and the liquid meniscus of the liquid that is to be dried out.

In the event that the gel is a silicon, an aluminium, or a silicon aluminum oxide gel, in general, groups of the formula MOH or MOR occur as original surface groups; in these M=Al or Si and R=$C_1$–$C_6$-alkyl, preferably methyl or ethyl. The original surface groups are replaced, either totally or in part, by conversion with surface modifying substances of the general formula R'$_n$MX$_m$ by inert groups of the type MR'$_n$. n and m are integers that are greater than zero, the sum of which corresponds to the valency of M. R' is hydrogen or a non-reactive organic linear, branched, cyclic, aromatic, or heteroaromatic radical such as $C_1$–$C_{18}$ alkyl, preferably $C_1$–$C_6$ alkyl, particularly methyl or ethyl, cyclohexyl or phenyl; independently of each other, the R' are equal or different, or can be bridged. Further, X is a halogen, preferably Cl, or an —OR". —SR" or NR"$_2$ radical, with R" standing for a straight chain or branched single or multiple, equally or differently substituted, aliphatic $C_1$ to $C_{18}$ radical in which one or more $CH_2$ groups can be replaced by —C≡C—, —CH=CH—, —COO—, —O(C=O)—, —SiR'"$_2$—, —CO—, phenylenediyl and/or up to every second $CH_2$ unit by O or NR'", with R'" standing for phenyl, $C_1$–$C_{18}$ alkyl or benzyl, or R" stands for a benzyl radical or phenyl radical that can be substituted by 1 to 5 substituents R', OH, OR', COOR', OCOR', SO$_3$H, SO$_2$Cl, F, Cl, Br, NO$_2$, or CN. In the case of N, the R" can be equal or different independently of each other. If m is at least two, the X can be equal or different, independently of each other, or can be bridged. Mixtures of the surface modifying substances can also be used.

It is preferred that silylating agents of the formula R'$_{4-n}$SiCl$_n$ or R'$_{4-n}$Si(OR")$_n$ with n=1 or 3 be used, when R' and R" have the above values. Silacanes are also suitable. It is preferred that methyltrichlorsilane, dimethyldichlorsilane, trimethylchlorsilane, trimethylmethoxysilane, or hexamethyldisilacane be used.

In Step e2), the silylated gel can be washed with a protic or aprotic solvent until the unconverted surface modifying substance has essentially been removed (residual content $\leq 1\%$-wt). Solvents suitable for doing this are those named for Step d). Analogously, the solvents named as being suitable at that point are also the preferred ones here.

In one special embodiment, in Step e3) the optionally strengthened, suface modified gel is dried at temperatures from −30 to 200° C., preferably 0 to 100° C., and at a pressure of 0.001 to 20 bar, preferably 0. 01 to 5 bar, and in particular from 0.1 to 2 bar.

Temperatures of higher than 200° C. and/or pressures higher than 20 bar are possible, but they are associated with excessive outlays and entail no advantages. Generally, the drying is continued until the gel has a residual solvent content of less than 0.1%-wt. Contact and convection drying are examples of suitable drying process.

In addition to the foregoing, the drying of the gel can be greatly accelerated by using dielectric drying processes, e.g., microwave drying. To this end, after surface modification, the solvent in Step e 2) is exchanged for a solvent that absorbs microwaves effectively; examples of such solvents are water, ethanol, or, preferably, acetone. The gels can then be dried very rapidly in a microwave drier. In the same way, it is possible to effect the drying by irradiation with visible light.

Gels that are between 0.5 and 5 mm thick are particularly suitable for solvent exchange and drying since the duration for the exchange of solvents or the drying time is essentially determined by diffusion of the solvents or of the solvent vapour.

Preferred is a process for manufacturing the aerogel composite materials according to the present invention, which contains an SiO$_2$ aerogel, that is characterised in that a) an aqueous waterglass solution (SiO$_2$ concentration generally $\leq 10\%$-wt, preferably $\leq 7\%$-wt) is adjusted to a pH value of $\leq 3$, for example with the help of an acid ion exchange resin or a mineral acid, and a base, in general NH$_4$OH, NAOH, KOH, Al(OH)$_3$ and/or colloidal silicic acid is added to the silicic acid that is formed, b) if required, fibres are added, c) the silicic acid is allowed to polycondense, d) the gel is washed with an organic solvent until the water content of the gel is $\leq 5\%$-wt, e1) the gel obtained in Step d) is converted with a silylating agent, e2) if necessary, the silylated gel is washed with an organic solvent until the residual content of the unconverted silylating agent $\leq 1\%$-wt, and e3) the silylated gel obtained in Step e1) or Step e2) is dried at minus 30 to 200° C. and at 0.001 to 20 bar.

It is preferred that an acid ion exchange resing be used in Step a).

The composite material obtained in this way is hydrophobic if the surface groups that are applied by surface modification are hydrophobic, for example, if trimethylchlorsilane is used. The hydrophobicity can be reduced subsequently, for example by expulsion or by partial pyrolysis.

As an alternative, in Step e), the gel obtained in Step d) can be dried to form an aerogel composite material by transferring the liquid contained in the gel into a supercritical state and then removing the liquid from the solid by flash evaporation at a super critical temperature. To this end, a liquid suitable for drying, such as liquid CO$_2$ or methanol must be used in Step d) for this exchange. Typical processes for super-critical drying from CO$_2$ are described, for example, in U.S. Pat. No. 4,610,863 or in Bommel, M. J., de Haan, A. B., *Journal of Materials Science*, 29, (1994), pp. 943–948, and from methanol, in EP-B-0396076 or WO 93/06044.

In order to obtain a hydrophobic aerogel at the end, the gel can be converted with a surface modifying substance between Step d) and Step e), if necessary after the exchange of solvent, when this will render the surface hydrophobic. If necessary, after this Step, the solvent must once again be exchanged for the liquid suitable for the drying process. The materials and processes for surface modification that are quoted above are suitable for this purpose. The conversion can, however, be carried out advantageously after the drying process, by means of a reaction in the gas phase.

It is preferred that, in order to keep the thermal conductivity as low as possible, the aerogels used according to the present invention contain no binders as additional materials.

According to a preferred variant, production of the films according to the present invention is carried out such that a suitable sol, if necessary after Step b), is applied to an optionally pre treated film and converted to a gel by polycondensation. The addition of the condensation agent, for example a base, can be made shortly before or even after application to the film.

Application can be carried out using thick and thin film techniques such as spraying, dipping, dip coating, trowelling, and brushing, that are familiar to the practitioner skilled in the art.

The gel, diluted as necessary, can be subjected to ultrasound treatment prior to the application process in order to achieve especially homogeneous layers during application.

The process is then continued as described for aerogel production, although constant attention must be paid to ensure that the adjusted temperatures are below the fusing or glass temperature of the uncoated film in order that it does not break down.

Films that are produced in this way exhibit very good adhesion of the aerogel and hardly any cracks.

A further production variant for the film according to the present invention is the production of an aerogel, preferably a glass-fibre reinforced aerogel, with subsequent adhesion of the aerogel layer to the film that has if necessary been pre-treated.

A further production of the film according to the present intention is affected by applying aerogel powder or aerogel granulate to a film that has, if necessary, been pre-treated, when the granulate can also be a ready-to-use powder to which coupling agents, for example in the form of physical adhesives, have been added. Next, a second film of the identical or of different type is laid on the aerogel layer and pressed onto the film, if necessary with the help of vacuum technique and, if necessary, whilst being heated when it is then so fused and/or cemented to it that areas of the gel are included. The film may already incorporate depressed areas that are necessary for an aerogel inclusion as a result of special texturing or a special shaping process.

The object of the present invention is also a film that can be obtained by using this process.

This procedure can be repeated as required in order to build up thicker layers or laminates.

The films according to the present invention can be used, for example, as thermal insulation materials.

In addition, they can also be used as acoustic absorption materials, either directly or in the form of resonance absorbers, since they have a low sound velocities and, compared to monolithic aerogels or xerogels, they provide higher acoustic attenuation and improved sound transmission from ultrasonic transmitters.

They are also suitable for electronic applications by virtue of their low dielectric constants and their low dielectric loss factor.

Additional possible applications are their use as absorption materials or, in the case of suitably porous film materials, as membranes.

EXAMPLES

Example 1

A Hostaphan® PET film (Hoechst Diafilm Company, Grees, S.C.) is treated with an oxygen plasma for 3 hours at 2.0 torr and then laid on a horizontal base with a 1 cm raised rim around the edges so as to be coated with a silicic acid solution. The film was then coated with 1 mm of a 9-% aqueous waterglass solution, the cations of which had been separated off through an ion-exchange column immediately prior to this. The pH value of the solution had previously been adjusted to 4.7 by a small addition of 0.1 n sodium lye. The base is closed tight and heated to 80° C. on a hot plate. Within a few minutes (10) the solution gels to form a solid gel, which is then cured for a further 3 hours at 80° C. The base with the film and the gel adhering to it were then cooled at a rate of 2° C. per minute, coated with 9 ml acetone, and allowed to stand for 20 minutes. The underlying acetone contains water from the gel layer. This is poured off and replaced by fresh acetone. This process is repeated until the water content of the aqueous acetone solution that is poured off is below 1% (Karl Fischer titration). The film is then coated with a solution of 5% trimethylchlorsilane in acetone.

The base is closed once again and allowed to stand for 1 hour. Then the remaining solution is poured off, washing is repeated 3 times, using fresh acetone for 20 minutes each time, and the film with the surface modified gel adhering to it is placed, unclosed, in a drying cabinet to dry at 50° C.

After 3 hours, the dried film is removed and then cooled. The aerogel layer has slight cracks, but remains cemented to the film when dry.

Five layers of the film produced in this way were tested by the hot-wire method (see, for example, O. Nielson, G. R üschenpöhler, J. Groβ, J. Fricke, *High Temperatures-High Pressures*, Vol. 21, pp. 267–274 (1989)). A conductivity of 21 mW/mK was measured.

Examples 2 to 22

After drying, the film coated with the gel was removed from the oven, carefully covered with a covering film of identical material to protect it against physical damage, and then used for measuring thermal conductivity.

The following films were tested analogously to Example 1:

| Example | Film | | Thermal conductivity mW/mK |
|---|---|---|---|
| 2 | Polyester (polyethyleneterephthalate) | "PET" | 14 |
| 3 | Low density polyethylene | "LDPE" | 18 |
| 4 | Ethylene-propylene copolymer | "EP" | 17 |
| 5 | Poly(4-methyl-pentane) | "TPX" | 19 |
| 6 | Polytetrafluorethylene | "PTFE" | 17 |
| 7 | Poly(1-butene) | "PB" | 18 |
| 8 | Polystyrene | "PS" | 18 |
| 9 | Polyvinylacetate | "PVAC" | 15 |
| 9 | Polyvinylchloride | "PVC" | 16 |
| 10 | Polyvinylidenechloride | "PVDC" | 18 |
| 11 | Polyvinylfluoride | "PVF" | 14 |
| 12 | Polyvinylacrylnitrile | "PAN" | 17 |
| 13 | Polymethylmethacrylate | "PMMA" | 16 |
| 14 | Polyoxymethylene | "POM" | 19 |
| 15 | Polyphenylenesulfon | | 18 |

-continued

| Example | Film | | Thermal conductivity mW/mK |
|---|---|---|---|
| 16 | Cellulosetriacetate | "LA" | 16 |
| 17 | Polycarbonate | "PC" | 15 |
| 18 | Polyethylenenaphthalate | "PEN" | 18 |
| 19 | Polycaprolactam | | 18 |
| 20 | Polyhexamethyleneadipamide | | 17 |
| 21 | Polyundecanoamide | | 16 |
| 22 | Polyimide | | 19 |

Example 23

Analogously to the production process explained in Example 1, a high-density polyethylene HDPE film was used and placed in the holder. A 1-mm thick layer of a GH 50.502 glass fibre mat (manufactured by "Glasfaser Regensburg") was laid on the sol, which had been previously annealed at 600° C. for 30 minutes. The sol was produced analogously to Example 1, and poured over the fibre glass mat. This forms a 1-mm thick layer of sol on the HDPE film, within which the mat is evenly distributed. The processing that follows is as described in Example 1. After drying, the film coated with the aerotgel is covered with a second layer of HDPE film. Since all the layers are transparent, the fibre structure of the included glass fibre mat is clearly visible. The thermal conductivity of the sample was measured at 18 mW/mK.

Example 24

As in Example 23, a PET film was used as the base. A 2-mm thick, fibre reinforced layer of aerogel was produced on this and then covered with an HDPE film. The thermal conductivity of the sample was measured at 16 mW/mK.

The following were tested analogously to Example 23:

| Example | Film | | Aerogel layer (mm) | Thermal conductivity mW/mK |
|---|---|---|---|---|
| 25 | Polyester (polyethyleneterephthalate) | "PET" | 2 | 15 |
| 26 | Low density polyethylene | "LDPE" | 1 | 19 |
| 27 | Ethylene-propylene copolymer | "EP" | 1.5 | 17 |
| 28 | Poly(4-methyl-pentane) | "TPX" | 2 | 13 |
| 29 | Polytetrafluorethylene | "PTFE" | 2 | 15 |
| 30 | Poly(1-butene) | "PB" | 1 | 16 |
| 31 | Polystyrene | "PS" | 2 | 14 |
| 32 | Polyvinylacetate | "PVAC" | 1 | 17 |
| 33 | Polyvinylchloride | "PVC" | 1 | 18 |
| 34 | Polyvinylidenechloride | "PVDC" | 1.5 | 14 |
| 35 | Polyvinylfluoride | "PVF" | 1.5 | 16 |
| 36 | Polyvinylacrylnitrile | "PAN" | 2 | 13 |
| 37 | Polymethylmethacrylate | "PMMA" | 2 | 13 |
| 38 | Polyoxymethylene | "POM" | 2 | 15 |
| 39 | Polyphenylenesulfon | | 1 | 16 |
| 40 | Cellulosetriacetate | "LA" | 1 | 17 |
| 41 | Polycarbonate | "PC" | 1.5 | 14 |
| 42 | Polyethylenenaphthalate | "PEN" | 1 | 18 |
| 43 | Polycaprolactam | | 2 | 15 |
| 44 | Polyhexamethyleneadipamide | | 1 | 18 |
| 45 | Polyundecanoamide | | 1 | 18 |
| 46 | Polyimide | | 1 | 19 |

Example 47

60 ml of an aqueous dispersion of styrene/acrylate copolymer, solids content: 19%-wt (34 ml Mowilith DM 760, 26 ml water) were prepared in a 200 ml beaker and 125 ml hydrophobic aerogel granulate with a grain size ranging from 50 to 250 μm (settled apparent density 0.08 g/cm³) were mixed with a propellor-type mixer at 1200 rpm, until a free-flowing suspension was formed. This was troweled onto a polyester film to form a 1-mm thick layer of thermal insulation adhesive. Next, a 2-mm thick, fibre-reinforced aerogel, produced from waterglass and microlith glass-needle mat was applied to it. Then a PET film, produced as for the base, was applied to the aerogel layer with the adhesive side down. The laminate prepared in this way was treated in an oven at 70° C. for 24 hours. The thermal conductivity of the laminate was measured at 24 mW/mK.

The following films were tested analogously to Example 47:

| Example | Film | | Aerogel layer (mm) | Thermal conductivity mW/mK |
|---|---|---|---|---|
| 48 | Polyester (polyethyleneterephthalate) | "PET" | 2 | 14 |
| 49 | Low density polyethylene | "LDPE" | 3 | 13 |
| 50 | Ethylene-propylene copolymer | "EP" | 4 | 14 |
| 51 | Poly(4-methyl-pentane) | "TPX" | 3 | 16 |
| 52 | Polytetrafluorethylene | "PTFE" | 2 | 18 |
| 53 | Poly(1-butene) | "PB" | 2 | 16 |
| 54 | Polystyrene | "PS" | 3 | 14 |
| 55 | Polyvinylacetate | "PVAC" | 1 | 19 |
| 56 | Polyvinylchloride | "PVC" | 1 | 20 |
| 57 | Polyvinylidenechloride | "PVDC" | 0.5 | 21 |
| 58 | Polyvinylfluoride | "PVF" | 2 | 20 |
| 59 | Polyvinylacrylnitrile | "PAN" | 3 | 16 |
| 60 | Polymethylmethacrylate | "PMMA" | 1 | 19 |
| 61 | Polyoxymethylene | "POM" | 2 | 15 |
| 62 | Polyphenylenesulfon | | 2 | 17 |
| 63 | Cellulosetriacetate | "LA" | 2 | 18 |
| 64 | Polycarbonate | "PC" | 1.5 | 14 |
| 65 | Polyethylenenaphthalate | "PEN" | 1 | 19 |
| 66 | Polycaprolactam | | 1 | 20 |
| 67 | Polyhexamethyleneadipamide | | 2 | 15 |
| 68 | Polyundecanoamide | | 1 | 17 |
| 69 | Polyimide | | 4 | 13 |

What is claimed is:

1. A film comprising a mateiral selected from the group consisting of polyester, cellulose, polyolefins, polystyrenes, polymethyl(meth)acrylates, polyvinylchloride, polyamides and polycarbonates wherein it is coated on at least one surface with an aerogel coating which has been surface-modified via silyation and formed by (a) applying a sol to said at least one side, (b) polycondensing said applied sol and (c) drying.

2. A film as defined in claim 1, wherein $SiO_2$ aerogels are used in the aerogel coating.

3. A film as defined in claim 1, wherein the aerogels have hydrophobic surface groups.

4. A film as defined in claim 1, wherein the aerogels of the aerogel layer have porosities of greater than 60% and densities of less than 0.6 g/cm³.

5. A film as defined in claim 1, wherein the aerogels have thermal conductivities of less than 40 mW/mK.

6. A film as defined in claim 1, wherein the aerogel coating contains an IR opacifier.

7. A film as defined in claim 1, wherein the aerogel coating contains fibers.

8. A film as defined in claim 1 wherein polyethylene terephathalate or polypropylene is used as film material.

9. A process for manufacturing a coated film as defined in claim 1, wherein a sol is applied to a film and converted to an aerogel coating by polycondensation and drying.

10. A process for manufacturing a coated film as defined in claim 1, wherein an aerogel coating is produced and cemented onto a film.

11. A film construct comprising a first and a second film, each film separately comprising a material selected from the group consisting of polyester, cellulose, polyolefins, polystyrenes, polymethyl(meth)acrylates, polyvinylchloride, polyamides and polycarbonates wherein a coat that, contains surface-modified by silyation aerogel powder and/or surface-modified by silylation aerogel granulate is arranged between said first and second film to which said coat is fused.

12. A film as defined in claim 11, wherein $SiO_2$ aerogels are used in the aerogel coat.

13. A film as defined in claim 11, wherein the aerogels have hydrophobic surface groups.

14. A film as defined in claim 11, wherein the aerogels of the aerogel coat have porosities of greater than 60% and densities of less than 0.6 g/cm$^3$.

15. A film as defined in claim 11, wherein the aerogels have thermal conductivities of less than 40 mW/mK.

16. A film as defined in claim 11, wherein the aerogel coat contains an IR opacifier.

17. A film as defined in claim 11, wherein the aerogel coat contains fibers.

18. A film as defined in claim 11, wherein polyethyleneterephthalate or polypropylene is used as film material.

19. A process for manufacturing a coated film as defined in claim 11, wherein the aerogel powder or aerogel granulate coat is applied to a film, a second film is laid thereon, and so fused or cemented to the first film that areas of the aerogel are included.

20. A thermal insulation material which comprises a coated film as defined in claim 1.

21. A film comprising a material selected from the group consisting of polyester, cellulose, polyolefins, polystyrenes, polymethyl(meth)acrylates, polyvinylchloride, polyamides and polycarbonates, which is coated on at least one side with an aerogel coating, wherein said aerogel coating is surface-modified via silyation and said coating comprises aerogel powder and/or aerogel granulate.

* * * * *